United States Patent Office 2,994,625
Patented Aug. 1, 1961

2,994,625
ACCUMULATOR ELECTROLYTE
Meyer Mendelsohn and Milton Comanor, New York, N.Y., assignors to Yardney International Corp., New York, N.Y., a corporation of New York
No Drawing. Filed Apr. 24, 1958, Ser. No. 730,525
7 Claims. (Cl. 136—154)

This application relates to rechargeable batteries and more particularly to rechargeable batteries operating on the soluble-negative principle such as those having zinc as the negative active electrode material.

In silver-zinc and related alkali-electrolyte cell systems the solubility and ion migration of the negative active material can be controlled, as taught by H. André in U.S. patents, Nos. 2,594,709–714, by the concurrent use of pressure and semi-permeable-membrane separators.

Recent refinements of the methods of André, including special surface treatments of the electrodes and controlled permeability of the separator system, have resulted in an extended cycle life for silver-zinc cells which, however, is still not wholly satisfactory for some applications.

It is a primary object of this invention to provide an improved cycle life for rechargeable batteries having zinc as the negative active material.

It is another object of this invention to provide a novel electrolyte system having a solubility depressant to prevent the formation of alkali-soluble zinc.

It is a further object of this invention to provide an electrolyte having dissolved components for preventing the formation of soluble zincates.

The above objects are achieved by the use in rechargeable batteries, based on zinc as the negative active material, of an electrolyte containing dissolved alkali salts of amphoteric metals. The use of such metal salts provides a condition within the electrolyte whereby the hydroxyl ions normally present in alkaline electrolytes are suppressed to the point where their scarcity precludes the formation of alkali zincates.

Such zincates have been proved on cycling to be prone to reduction in filiform condition throughout the solution. These filiform zinc particles have a tendency to grow from the face of the negative electrode through the pores of both permeable and semipermeable membranes toward the positive electrode. Upon contact with the positive electrode such filiform trails provide highly conductive pathways for the discharge of the cell. These filiform trails, or "trees" as they are known in the battery industry, thus tend to short-circuit the cell so as not only to dissipate the stored electrochemical energy but also to give rise to dangerous heat developments.

Among the various alkali salts of amphoteric materials it has been found that the most suitable are those which have a high degree of solubility in the electrolyte, provide highly conductive solutions with the electrolyte and have reactivity coefficients compared to alkali zincates which favor the formation of alkali amphoterates in preference to alkali zincates. This favorable reactivity coefficient may result from any of several chemical mechanisms including the formation of amphoteric complexes, the reduction of solubility of zincates and/or the immobilization of soluble zinc at the face of the negative electrode. Among the amphoteric ions there may be mentioned aluminates, molybdates, tungstates, arsenates, vanadates, stannates and plumbates. All of the above, to the degree that they are soluble, contribute to the aforementioned prevention of zincate formation in the electrolyte. The most favorable compounds among those mentioned are those with a position in the electrochemical series such that they will not during the charging phase of the cycle be liberated in metallic form on the face of the negative electrode. This includes particularly the aluminates.

The invention will be particularly described with reference to the above-mentioned aluminates. The preferred aluminates are those of sodium, potassium and lithium, although cesium and rubidium aluminates are also operative.

The electrolytes of this invention include alkaline electrolytes having dissolved therein alkali aluminates of the same alkali cation, of such as a solution of potassium aluminate in potassium hydroxide, or alkaline electrolytes in which there is dissolved an alkali aluminate having a different alkali cation, e.g. solutions of sodium and/or lithium aluminates in potassium hydroxide. The electrolytes may also be prepared from aqueous solutions of the alkali aluminates.

Each of the above classes of electrolytes offer an advantage over each of the others for certain usages. Conductivity, stability, freezing point, viscosity etc. vary from class to class and within each class, and the choice between the classes and compositions must, of course, be dictated by the particular service for which the cell is required. High-rate cells require electrolytes having low resistivity, which may be chosen from those containing the lower percentages of KOH including particularly those of the third class mentioned above. Cells subjected to long periods of overcharge function best with electrolytes that are almost completely saturated with respect to both the alkali and the aluminate. It has been found that under such conditions, while there is a slight loss in maximum discharge rate, the solubility of zincate is materially decreased so that the presence of its ions in the electrolyte is reduced to almost infinitesimal amounts as compared to the solubility of zincate in KOH. The solubility of the zinc is so reduced in certain combinations as to render possible the construction of rechargeable silver/zinc cells without semipermeable separators.

The following examples are cited to demonstrate general techniques and that they in no way are intended to limit the invention with respect to quantities or composition:

Example 1

A group of standard one-ampere-hour silver-zinc cells of conventional commercial construction were filled with an electrolyte consisting of 40% potassium hydroxide saturated with aluminate ion. This corresponded to an aluminum-metal content of 6.4% by weight. A similar group of cells were filled with a 40% KOH solution. The cells of both groups were cycled on a deep-discharge 100%-overcharge cycle. Water was added to the cells when necessary. Cells from the latter group, i.e. those wherein the electrolyte contained no aluminum, began failing after 30 cycles and all had failed by 63 cycles. Upon examination of these control cells, it was found that the cause of 85% of the failures was penetration of crystalline zinc through the separator, thereby providing short circuit pathways. The cells containing the electrolyte according to this invention all uniformly surpassed 75 cycles, and 65% passed 100 cycles at which point the test was discontinued. Ten percent of the failures were found to be of a mechanical nature and the rest were due to separator cracks. On examination, in all the aluminum-enriched cells at the end of the test there was to be found only microscopic evidence of zinc crystallization and no zinc penetration.

Example 2

A test was set up according to Example 1 in which the standard electrolyte consisted of 40% KOH and the test electrolyte consisted of 40% KOH containing dissolved aluminate ion to an extent representing 3% aluminum metal by weight.

The cells were cycled in a manner similar to that of Example 1. The behavior of the control cells was comparable to that shown in Example 1. The test cells all survived 75 cycles uneventfully and at 100 cycles there was mechanical failure amounting to 10% of the test group and electrochemical failure of 16% of the test group. The electrochemical failure resulted primarily in alterations of the interelectrode separator by spalling and cracking. Zinc crystallization was only evident by microscopic and chemical tests although there was some evidence of zinc having penetrated through the cracked areas of the separators.

*Example 3*

Another group of cells were prepared as in Example 1, with the test electrolyte containing aluminate equivalent to 1%, content by weight, of aluminum metal. These cells were cycled on the same regime. Fifty percent of the test group survived 100 cycles, and none of the failures, of which 10% were due to mechanical causes, occurred until the 75-cycle mark had passed. The 40% electrochemical failures were evenly distributed between microcrystalline penetration of the separator and failure of the separator system due to chemical cracking.

In all of the above cases, except where failure was due to obvious mechanical defects, all of the cells containing the electrolyte according to this invention surpassed by at least 50% the performance that would be expected from conventional electrolyte systems. The exact mechanism of the performance of the electrolyte in this system is not fully understood, but it appears to consist of a combination of factors including reduction of zinc solubility and complexing of the dissolved zinc. We have found that the desirable characteristics of these electrolytes improve performance and life particularly in rechargeable batteries based on soluble zinc electrodes, such as the silver-zinc battery or the nickel-zinc battery, and under certain very favorable circumstances even permit recharging zinc-mercury cells. The latter are rendered rechargeable by the reduction of zinc crystallization and penetration.

The amount of aluminate necessary to obtain substantially complete saturation, in order to suppress the formation of zincates, may depart somewhat from the value given in Example 1 (depending on the nature of the electrolytic solution) and may range up to approximately 7%, by weight, in terms of aluminum metal.

We claim:

1. An electrolyte for electrochemical cells having zinc as the major active material, comprising a substantially saturated solution of aluminate ions in an aqueous alkali medium substantially free from zincate ions.

2. An electrolyte for electrochemical cells having zinc as the negative active material, comprising an aqueous solution of an alkali hydroxide having dissolved therein an alkali aluminate, said solution being substantially free from zincate ions.

3. An electrolyte for electrochemical cells having zinc as the negative active material, comprising an aqueous solution of potassium hydroxide having dissolved therein an alkali aluminate, said solution being substantially free from zincates.

4. An electrolyte for electrochemical cells having zinc as the negative active material, comprising an aqueous solution of potassium hydroxide having dissolved therein potassium aluminuate in a proportion sufficient for substantial saturation, said solution being substantially free from zincate ions.

5. An electrolyte according to claim 4 wherein said potassium hydroxide is present in a concentration of substantially 40%, said aluminate being present in a quantity of substantially 6.4%, by weight, in terms of metallic aluminum.

6. An electrochemical cell comprising a positive electrode, a negative electrode and an electrolyte, said negative electrode containing at least 50% of zinc as the active material, said electrolyte comprising an aqueous alkali solution substantially saturated with the ions of an alkali aluminate while being substantially free from zincate ions.

7. An electrochemical cell according to claim 6, wherein the alkali solution comprises KOH of substantially 40% concentration.

References Cited in the file of this patent

UNITED STATES PATENTS

| | | |
|---|---|---|
| 300,933 | Winch | June 24, 1884 |
| 402,006 | Desmazures | Apr. 23, 1889 |
| 1,416,738 | Muren | May 23, 1922 |
| 1,955,115 | Drumm | Apr. 7, 1934 |
| 2,594,712 | André | Apr. 29, 1952 |
| 2,714,624 | Costa et al. | Aug. 2, 1955 |